United States Patent
Igotti et al.

(10) Patent No.: US 11,269,996 B2
(45) Date of Patent: *Mar. 8, 2022

(54) SYSTEM AND METHOD FOR PROTECTING MEMORY PAGES

(71) Applicant: AO Kaspersky Lab, Moscow (RU)

(72) Inventors: Nikolay N. Igotti, Moscow (RU); Mikhail A. Ershov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 263 days.

This patent is subject to a terminal disclaimer.

(21) Appl. No.: 16/188,745

(22) Filed: Nov. 13, 2018

(65) Prior Publication Data
US 2019/0080086 A1    Mar. 14, 2019

Related U.S. Application Data

(63) Continuation of application No. 15/360,180, filed on Nov. 23, 2016, now Pat. No. 10,162,964, which is a (Continued)

(51) Int. Cl.
*G06F 12/14* (2006.01)
*G06F 21/55* (2013.01)
(Continued)

(52) U.S. Cl.
CPC ........ *G06F 21/554* (2013.01); *G06F 9/45545* (2013.01); *G06F 9/45558* (2013.01);
(Continued)

(58) Field of Classification Search
CPC ............... G06F 21/561; G06F 9/45545; G06F 9/45558; G06F 12/14; G06F 21/554;
(Continued)

(56) References Cited

U.S. PATENT DOCUMENTS

| | | |
|---|---|---|
| 5,913,058 A | 6/1999 | Bonola |
| 7,895,124 B2 | 2/2011 | Baratti |

(Continued)

FOREIGN PATENT DOCUMENTS

WO    2014/024279 A1    2/2014

OTHER PUBLICATIONS

European Search Report for EP 15 19 5654 dated May 13, 2016.
(Continued)

*Primary Examiner* — Matthew T Henning
(74) *Attorney, Agent, or Firm* — Arent Fox LLP; Michael Fainberg (57) ABSTRACT

A method for protecting memory pages of a computing device using a hypervisor includes detecting, by a hypervisor, a token associated with the trusted program, in response to receiving a hypercall from a trusted program. The token associated with the trusted program is checked against a saved token of the hypervisor to determine trustworthiness of the trusted program. The hypervisor creates a memory page containing a safe hypercall address of the hypervisor. Addresses of the memory page are transmitted from the hypervisor to the trusted program. The hypervisor allows execution of the hypercall by the trusted program accessing the safe hypercall address found at the addresses of the memory page.

12 Claims, 5 Drawing Sheets

Related U.S. Application Data continuation of application No. 14/935,852, filed on Nov. 9, 2015, now Pat. No. 9,536,088.

(51) Int. Cl.
| | |
|---|---|
| *G06F 21/56* | (2013.01) |
| *G06F 9/455* | (2018.01) |
| *G06F 21/53* | (2013.01) |
| *G06F 21/64* | (2013.01) |
| *G06F 21/44* | (2013.01) |
| *G06F 21/57* | (2013.01) |

(52) U.S. Cl.
CPC .............. *G06F 12/14* (2013.01); *G06F 21/44* (2013.01); *G06F 21/53* (2013.01); *G06F 21/561* (2013.01); *G06F 21/57* (2013.01); *G06F 21/64* (2013.01); *G06F 2009/45583* (2013.01); *G06F 2009/45587* (2013.01); *G06F 2212/1052* (2013.01); *G06F 2221/033* (2013.01); *G06F 2221/034* (2013.01)

(58) Field of Classification Search
CPC .......... G06F 21/44; G06F 21/57; G06F 21/53; G06F 21/64; G06F 2221/033; G06F 2221/034; G06F 2212/033; G06F 2212/1052; G06F 2009/45587; G06F 2009/45583
USPC ........................................................... 726/24
See application file for complete search history.

(56) References Cited

U.S. PATENT DOCUMENTS

| | | | |
|---|---|---|---|
| 8,990,934 B2 | 3/2015 | Pavlyushchik | |
| 9,021,476 B1 | 4/2015 | Pratt | |
| 9,069,586 B2 | 6/2015 | Dang et al. | |
| 9,286,091 B2 | 3/2016 | Adachi et al. | |
| 10,162,964 B2* | 12/2018 | Igotti | G06F 21/53 |
| 2003/0037179 A1 | 2/2003 | Duncan | |
| 2004/0177054 A1 | 9/2004 | Stern | |
| 2008/0184373 A1 | 7/2008 | Traut et al. | |
| 2009/0113110 A1 | 4/2009 | Chen | |
| 2011/0179418 A1 | 7/2011 | Takebe | |
| 2012/0017029 A1 | 1/2012 | Santos et al. | |
| 2012/0084381 A1 | 4/2012 | Alladi et al. | |
| 2012/0173871 A1 | 7/2012 | Ashok et al. | |
| 2013/0061337 A1 | 3/2013 | Zimberoff | |
| 2013/0091568 A1* | 4/2013 | Sharif | G06F 21/50 726/22 |
| 2013/0111308 A1 | 5/2013 | Sauber et al. | |
| 2013/0332696 A1 | 12/2013 | Schmidt et al. | |
| 2014/0053272 A1 | 2/2014 | Lukacs et al. | |
| 2014/0281354 A1 | 9/2014 | Tkacik et al. | |
| 2014/0331017 A1 | 11/2014 | Dawson et al. | |
| 2015/0058619 A1 | 2/2015 | Sweet et al. | |
| 2015/0178198 A1 | 6/2015 | Pratt et al. | |

OTHER PUBLICATIONS

Russinovich, Mark E., David Solomon (2005) Microsoft windows Internals (4 ed) Microsoft Press, http://csit.udc.edu~byu/UDC3529315/Windows-Internals-4e.pdf.
A Guide to Understanding Audit in Trusted Systems, the Rainbow Books; issued by the National Computer Security Center (NCSC), Jul. 28, 1987 pp. 1-27.

* cited by examiner

SYSTEM AND METHOD FOR PROTECTING MEMORY PAGES

CROSS-REFERENCE TO RELATED APPLICATIONS

The present application is a continuation of U.S. application of patent application Ser. No. 15/360,180 titled "SYSTEM AMD METHOD FOR PROTECTION OF MEMORY PAGES USING A HYPERVISOR", filed on Nov. 23, 2016 which is a continuation of U.S. application of patent application Ser. No. 14/935,852 titled "SYSTEM AND METHOD FOR PROTECTION OF MEMORY IN A HYPERVISOR", filed on Nov. 9, 2015, now U.S. Pat. No. 9,536,088, both of which are herein incorporated by reference in their entirety.

FIELD OF TECHNOLOGY

The present disclosure relates generally to the field of computer security, and, more specifically, to systems and methods of protecting memory pages of a computing device using a hypervisor.

BACKGROUND

Computer malware (such as Trojan horses, viruses and worms) is being developed at the ever-increasing pace and is using many methods for circumventing antivirus applications. One such method is to conceal certain resources of the computer system (such as files or registry branches) from the antivirus application, which is performing the antivirus check. By the classification of the antivirus companies, the malicious programs which make use of such a method are known as rootkits, or they make use of rootkit technology. Rootkit technologies turn out to be even more dangerous if it is possible to make use of vulnerabilities in components of the operating system (OS) which work at the kernel level. This does not allow present-day antivirus applications to detect malicious programs which use such technologies.

One approach to solving such a situation is to use a hypervisor, which affords isolation of different OSs from each other, a dividing of the resources between different running OSs, and a management of resources. At the same time, the execution of code in hypervisor mode occurs on an even lower level than the execution of code at the kernel level. Not surprisingly, the companies which make antivirus applications are interested in such an approach. However, current solutions are ineffective and in some cases impossible to employ.

SUMMARY

Disclosed are system and method for protecting memory pages of a computing device using a hypervisor. An exemplary method comprises: in response to receiving a hypercall from a trusted program, detecting by the hypervisor a token associated with the trusted program; checking the token associated with the trusted program against a saved token of the hypervisor; in response to detecting that the token associated with the trusted program matches the saved token of the hypervisor, transmitting addresses of a plurality of memory pages from the hypervisor to the trusted program; and performing a checksums verification for data stored in the plurality of memory pages.

In one exemplary aspect, the saved token of the hypervisor is configured to be generated by the hypervisor in response to receiving a first hypercall from the trusted program.

In one exemplary aspect, the method further comprises generating by the hypervisor a plurality of tokens, each token uniquely corresponding to an operating system present in the computing device.

In one exemplary aspect, performing the checksums verification for data stored in the plurality of memory pages comprises periodically calculating checksums and comparing them with a previously saved value to detect a change in the trusted program.

In one exemplary aspect, the method further comprises, in response to detecting the change in the trusted program, restoring the trusted program by the hypervisor via reloading the trusted program from a disk of the computing device.

In one exemplary aspect, the method further comprises, establishing a protected communication channel between the trusted program and the hypervisor such that the trusted program is configured to make a hypercall call for a code of the hypervisor via the protected communication channel to ensure a confidentiality of the hypervisor call address by which the code is invoked.

In one exemplary aspect, the method further comprises, configuring the trusted program to organize virtual memory pages of an operating system of the computing device; and configuring the hypervisor to verify the virtual memory pages of the operating system.

An exemplary system for protecting memory pages of a computing device using a hypervisor comprises a hardware processor configured to: in response to receiving a hypercall from a trusted program, detect by the hypervisor a token associated with the trusted program; check the token associated with the trusted program against a saved token of the hypervisor; in response to detecting that the token associated with the trusted program matches the saved token of the hypervisor, transmit addresses of a plurality of memory pages from the hypervisor to the trusted program; and perform a checksums verification for data stored in the plurality of memory pages.

An exemplary non-transitory computer readable medium storing computer executable instructions for protecting memory pages of a computing device using a hypervisor, includes instructions for: in response to receiving a hypercall from a trusted program, detecting by the hypervisor a token associated with the trusted program; checking the token associated with the trusted program against a saved token of the hypervisor; in response to detecting that the token associated with the trusted program matches the saved token of the hypervisor, transmitting addresses of a plurality of memory pages from the hypervisor to the trusted program; and performing a checksums verification for data stored in the plurality of memory pages.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method, and computer program product for protecting memory pages of a computing device using a hypervisor. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

A hypervisor is a program enabling a simultaneous, parallel execution of several operating systems (OS) on the same computer. Hypervisors are of two types: the first has its own built-in device drivers and scheduler, and therefore does not depend on a particular OS, while the second type works in the same ring as the kernel of the main OS (kernel mode or ring 0). The first type of hypervisors is also known as bare-metal and is the preferred example for realization of the hypervisor in the present invention. The execution of code in hypervisor mode occurs at an even lower level than the execution of code in kernel mode or ring 0.

A call for code being executed in hypervisor mode (a hypercall) is a transition to the execution of code in hypervisor mode (also simply called 'execution'), which requires hardware support of the virtualization technology on the part of the processor.

A trusted OS is an operating system using adequate hardware and software to enable a simultaneous processing of information of different degrees of secrecy by a group of users without violating the access rights. Generally, a trusted OS is able to provide confidentiality and integrity of the user data. One can learn more about trusted systems in A Guide to Understanding Configuration Management in Trusted Systems (1988).

A trusted call for code is a call for outside code during which it is guaranteed that the call comes from a trusted source (a memory page belonging to the process of a trusted application), which excludes the possibility of a call for outside code from malicious or untrusted programs. A trusted application is a program whose executable file has a digital signature and is not malicious.

Figure 1:
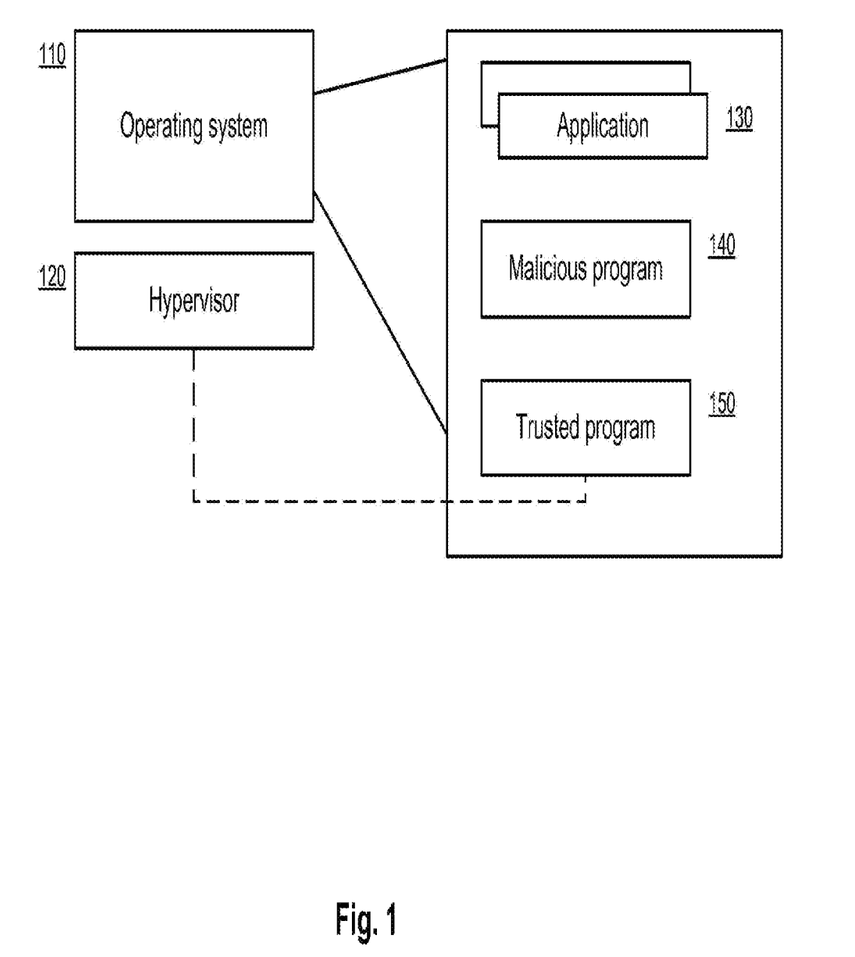
FIG. 1 illustrates an exemplary system in which a mechanism of a trusted call for code in hypervisor mode is realized.

FIG. 1 shows an example of a system in which a mechanism of a trusted call for code in hypervisor mode is realized. The operating system 110, executes various applications 130, as well as a trusted program 150, and a malicious program 140. The applications 130 include various user applications such as a browser, a word processor, and others.

The malicious program 140, such as a virus, a worm, a Trojan or other, can use different ways of concealing its presence in the operating system (e.g., using rootkit technologies), making it possible to avoid detection by the antivirus applications (not shown in FIG. 1, but may be one of the applications 130). This fact means that the OS 110 cannot be considered to be trusted and it is a threat to the user data. One can read about ways of concealing the presence of malicious programs in an operating system in various sources, such as http://en.wikpedia.org/wiki/Rootkit.

In order to detect the presence of a malicious program 140, as well as to prevent the possibility of access by the malicious program 140 to the user information, a trusted program 150 and hypervisor 120 may be used. The trusted program 150 may be realized both in the form of a separate application and in the form of a component of the antivirus application. The key characteristic of the trusted program 150 is its ability to make calls for execution of code of the hypervisor 120. As already noted above, the execution of code in hypervisor mode occurs on an even lower level than the execution of code in kernel mode, which makes it possible to ignore possible rootkit technologies used by the malicious program 140. The code being executed in kernel mode (ring 0) does not have access to the code, which will be executed in hypervisor mode. In the same fashion, the code being executed in user mode (ring 3) does not have access to the code, which is executed in kernel mode. More details can be found about protection rings in various publications such as Russinovich, Mark E.; David A. Solomon (2005). *Microsoft Windows Internals* (4 ed.). Microsoft Press. It should be noted that an execution of code in ring 0 is also known as an execution on the kernel level, and an execution of code in ring 3 is an execution on the user level.

As already mentioned, the trusted program 150 makes calls for execution of code of the hypervisor 150 (whose code will be executed in hypervisor mode), i.e., it makes a hypercall. It is assumed that the OS 110 is initially trusted, but the malicious program 140 compromises the trust level of the OS. It is also presumed that the malicious program 140 has a complex logic (such as a rootkit functionality), making it possible to avoid its detection by the antivirus application installed in the OS 110 (not shown in FIG. 1). Thus, it is necessary to provide protection for the confidential user information from the malicious program 140.

In a modern OS, information can be protected in several ways: using encryption, controlling access to data storage, and providing protection of the virtual memory of those processes that work with user data. The present invention generally relates to the systems and methods for protection of the virtual memory of processes.

The methods of protecting the virtual memory of processes are known. For example, the NX bit makes it possible to set a bit forbidding the execution for a memory page, in order to achieve the possibility of preventing the execution of data as executable code. For example, a commonly owned U.S. Pat. No. 8,990,934, which is incorporated by reference herein, describes a technique of controlling the mutually exclusive setting of an execute bit and a write bit for a memory page in order to prevent the writing and execution of an exploit.

However, known technologies have a drawback in that they work on the level of the OS kernel, which leaves the possibility of execution of malicious code on the same level of privileges, but with an earlier onset of working during the startup (initialization) of the OS after the computer is turned on. Such a malicious code may disconnect or, even worse, control the above-described memory protection algorithms, which again does not afford protection for the user's information in these cases. More details on the startup (initialization) of the OS after turning on the computer can be found in various publications, such as Russinovich, Mark E.; David A. Solomon (2005); Microsoft Windows Internals (4 ed.); Microsoft Press.

The execution of code in hypervisor mode makes it possible to check for memory changes on the part of a malicious code, even if the latter is executed in kernel mode. However, a call for the execution of code in hypervisor mode—the making of a hypercall—requires a separate application, whose code will make such hypercalls. In the present disclosure, that application is the trusted program 150, which may be an antivirus application.

It is important to note that it is generally very difficult to make code in hypervisor 120 mode in the form of a monolithic code sector which will contain verifications of virtual memory pages of the processes running in the OS 110, for several reasons:
the hypervisor code becomes "overloaded" (it proves to be too complex to write and debug), it begins to consume too may system resources, especially processor time;
the hypervisor code works too "low" (on a hypervisor level), i.e., it does not "know" the mechanism of working of the OS (kernel level), which works "higher" than the hypervisor, this problem being characteristic of the bare-metal hypervisors.

Therefore, it may be desirable to move some of the functionality out of the hypervisor 120 into the trusted program 150, while leaving in the hypervisor 120 only the memory page verification functionality. The trusted program 150 may be implemented to allow for the specifics of the realization of the OS 110 (for example, allowing for the virtual memory page organization of the Windows OS), making it possible to have this hypervisor 120 as a cross-platform hypervisor 120.

In one exemplary aspect, there should be a protected communication channel between the trusted program 150 and the hypervisor 120. In order to provide such a communication channel, it is necessary that only the trusted program 150 can make a call for code of the hypervisor 120 (a hypercall). Considering that the hypervisor 120 code is stored in RAM, it is necessary to ensure confidentiality of the address by which this code is invoked.

Figure 2:
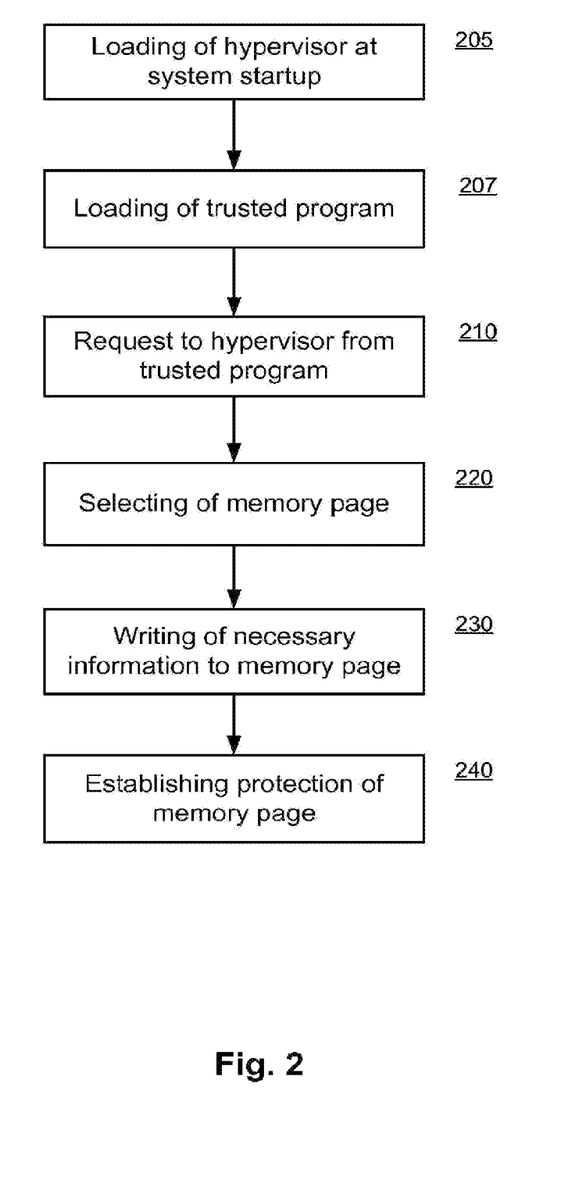
FIG. 2 illustrates an exemplary method of providing a hypervisor call address for a trusted program.
Figure 3:
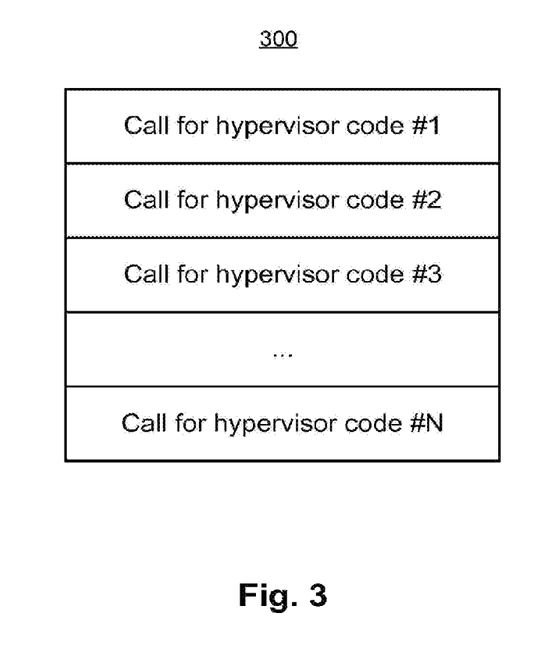
FIG. 3 illustrates an example of a memory page containing the hypervisor address for a call from the trusted program.

FIG. 2 exemplary method of providing a hypervisor 120 call address for a trusted program 150. In step 205, immediately after the boot-up of the computer system, the hypervisor 120 is loaded even before the initialization of the OS 110. As a rule, hypervisors of bare-metal type are initialized prior to the starting of the host OSs. A host OS means any OS which is started after the initialization of the hypervisor—in the given case, this is the OS 110. In step 207, the trusted program 150 is loaded, which is generally realized in the form of a driver of the OS 110, and it is loaded as soon as possible. This requirement is necessary in order to still consider the OS 110 to be trusted in step 207, since the early start-up of the trusted program 150 makes it possible to start it before the malicious program 140 is started. In step 210, the trusted program 150 performs the first call of the hypervisor 120 code (a hypercall), after which the address of the hypervisor 120 is returned to memory (the so-called safe hypercall address). Next, this address needs to be protected against unauthorized access, for which, in step 220, a memory page 300 is created, whose exemplary structure is shown in FIG. 3. The memory page itself consists of a set of memory addresses by which hypercalls can be done. In one exemplary aspect, only one call will result immediately in the hypercall, while the others will cause an exception and an error in the working of the OS 110 with subsequent rebooting thereof. This memory page 300 may be created either by the trusted program 150 or directly by the hypervisor 120 during its first call. The filling of the page by code with calls is done by the hypervisor 120 in step 230. The memory page may be additionally protected by, for example, setting, in step 240, a security parameter (e.g., a security bit) indicating that this memory page cannot be overwritten. In various aspects, the security parameter may be set either by the trusted program 150 or by the hypervisor 120.

Let us consider the mechanism of sending the correct call address of the hypervisor 120 to the trusted program 150. Since the storing of the address itself in the memory of the process of the trusted program 150 might not be safe, since one cannot rule out an intervention by the malicious program 140 in order to get it, the trusted program 150 also stores a token in the form of a randomly generated key, which can be used to make hypercalls. The token itself is generated by the hypervisor 120 at the time of its first call (step 210 in FIG. 2) and sent to the trusted program 150 in order to compare the value of the token during the hypercall, thereby preventing situations with a malicious call of the hypervisor 120. The token is generated once during the working of the computer system (after turning on the power supply) and it is unique to the OS 110. Thus, if other host OSs are present in the computer system, the hypervisor 120 generates an individual token for each of them.

Figure 4:
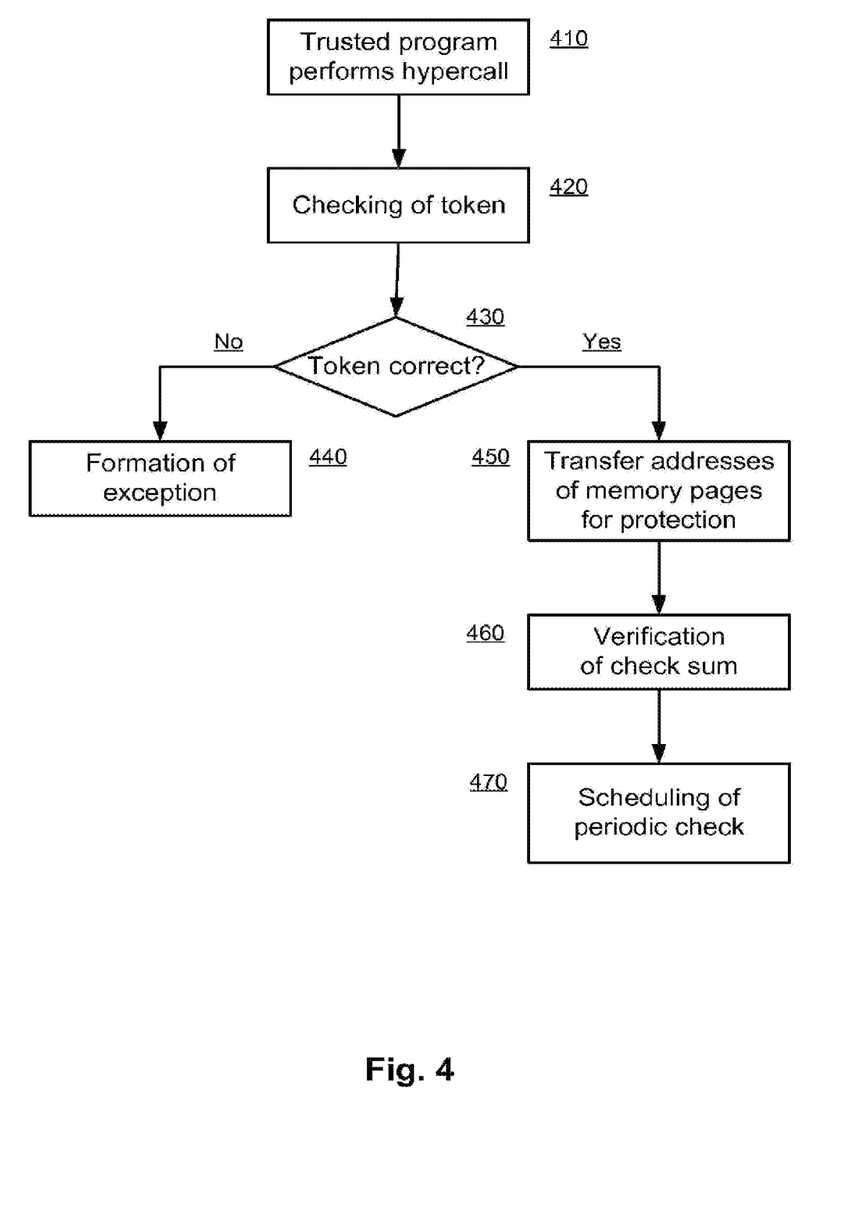
FIG. 4 illustrates an exemplary method of protecting memory pages using a hypervisor.

FIG. 4 illustrates an exemplary method of protecting memory pages using a hypervisor. In step 410, the trusted program 150 makes hypercalls, after which, in step 420, the token is checked and, if the token of the trusted program 150 matches the saved token of the hypervisor 120 (check in step 430), then in step 450 the trusted program 150 sends the addresses of the memory pages which require protection. The memory protection involves setting of bits to forbid/allow various operations—Read, Write, and eXecute code. In step 460, checksums verification is performed (cyclic redundancy check, CRC) for the data which is being stored in the protected memory pages. In step 470, the hypervisor 120 orders a periodic verification by the calculation of the checksums for the protected memory pages because an attack is possible involving operation by the linear addresses. The periodic verification can be initialized by either the hypervisor 120 or the trusted program 150 by using hypercalls at equal intervals of time. The hypervisor 120 can also check the integrity of the trusted program 150 in order to make sure it has not been altered by the malicious program 140. The integrity check includes computing a checksum and comparing it with a previously saved value to determine a change in the trusted program 150. This check occurs in step 420. If the code of the trusted program 150 has been changed, the hypervisor can restore it in memory by loading it from disk.

Below is an example of an attack involving operation by linear addresses. For example, the IDT (Interrupt Dispatch Table) of the OS 110 is located at linear address 0xF1D10000, which is a mapping (i.e., a mapping of the address of the virtual memory page onto the physical address) of the physical address 0x123000. The hypervisor 120 can establish the above-described protection (with no loss of performance) for the physical page at address 0x123000. But the malicious program 140 can pick out a physical page, such as 0x321000, copy therein the contents of the original page 0x123000, having replaced the necessary elements there (in the given example, this will be the interrupt handler), and establish the mapping 0xF1D10000->0x321000, so that the hypervisor 120 cannot detect the change, not having information on the logic of the working of the virtual memory in the OS 110. Therefore, the trusted program 150 should periodically check from within the OS 110 the correctness of the page tables, such that, as in the given example, 0xF1D1000 indeed corresponds to 0x123000 and not something else.

Let us consider examples of the storage of the hypervisor 120 prior to its loading. The code of the hypervisor 120 may be stored either as in a UEFI (Unified Extensible Firmware Interface) service or in a separate device on the PCI or PCIe board, which device is not defined in the OS 110 (e.g., the hypervisor 120 or the trusted program 150 independently processes interrupts from this device), or by using a disk virtualization (the hypervisor 120 excludes sectors of a disk on which its code is stored, changing the disk driver basic functionality).

Figure 5:
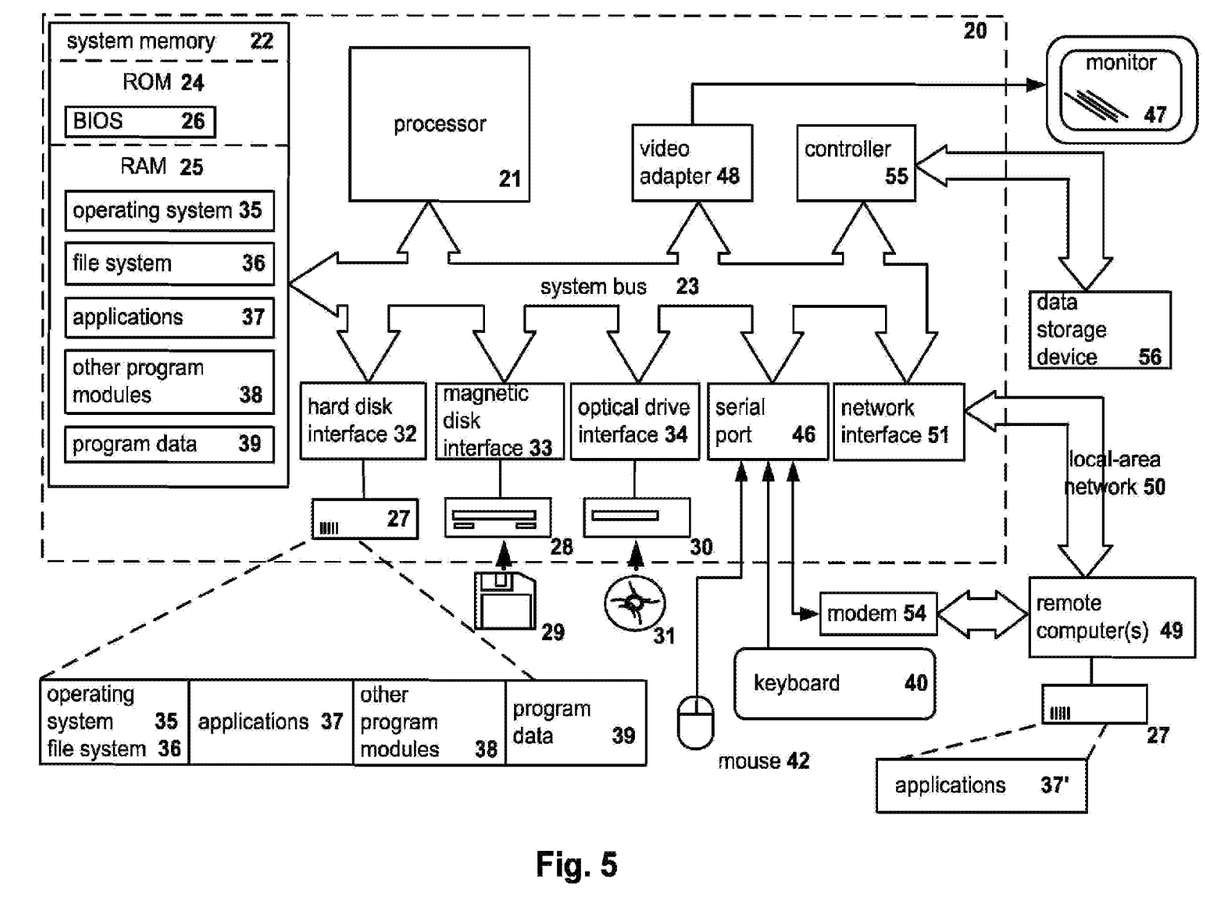
FIG. 5 illustrates an example of a general-purpose computer system by means of which the disclosed aspects of systems and method can be implemented.

FIG. 5 illustrates an example of a general-purpose computer system (which may be a personal computer or a server) on which the disclosed systems and method can be implemented. As shown, the computer system includes a central processing unit 21, a system memory 22 and a system bus 23 connecting the various system components, including the memory associated with the central processing unit 21. The system bus 23 is realized like any bus structure known from the prior art, containing in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate in a network environment, using a network connection to one or more remote computers 49. The remote computer (or computers) 49 are also personal computers or servers having the majority or all of the aforementioned elements in describing the nature of a personal computer 20, as shown in FIG. 5. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 5 above). Accordingly, each module can be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for protecting memory pages using a hypervisor, the method comprising:
    generating by the hypervisor executing on the computing device a plurality of tokens, each token uniquely corresponding to an operating system present on the computing device;
    in response to receiving a hypercall from a trusted program, detecting, by the hypervisor from the plurality of tokens, a token associated with the trusted program;
    checking the token associated with the trusted program against a saved token of the hypervisor to determine trustworthiness of the trusted program;
    creating, by the hypervisor, a memory page comprising a safe hypercall address of the hypervisor;
    transmitting addresses of the memory page from the hypervisor to the trusted program;
    establishing a protected communication channel between the trusted program and the hypervisor such that only the trusted program is permitted to make a hypercall call for a code of the hypervisor via the protected communication channel to ensure a confidentiality of the safe hypercall address by which the code is invoked;
    performing a checksum verification for data stored in the memory page to prevent linear address attacks when a malicious program modifies the trusted program, wherein performing the checksums verification comprises periodically calculating checksums and comparing them with a previously saved value to detect a change in the trusted program and wherein the checksum verification is triggered by the trusted program making a plurality of hypercalls at equal intervals of time; and
    allowing, by the hypervisor, execution of the hypercall by the trusted program accessing the safe hypercall address found at the addresses of the memory page.

2. The method of claim 1, wherein the saved token of the hypervisor is configured to be generated by the hypervisor in response to receiving a first hypercall from the trusted program.

3. The method of claim 1, further comprising:
    in response to detecting the change in the trusted program, restoring the trusted program by the hypervisor via reloading the trusted program from a disk of the computing device.

4. The method of claim 1, further comprising:
    configuring the trusted program to organize virtual memory pages of an operating system of the computing device; and
    configuring the hypervisor to verify the virtual memory pages of the operating system.

5. A system for protecting memory pages of a computing device using a bare-metal hypervisor, the system comprising;
    a processor configured to:
        generate by the bare-metal hypervisor a plurality of tokens, each token uniquely corresponding to a host operating system (OS) present on the computing device;
        in response to receiving a hypercall from a trusted program, detect by the bare-metal hypervisor, from the plurality of tokens, a token associated with the trusted program, wherein the trusted program is a driver of one of a plurality of host OSs present on the computing device and the trusted program is loaded during initialization of the respective host OS;
        check the token associated with the trusted program against a saved token of the hypervisor;
        create, by the hypervisor, a memory page comprising a safe hypercall address of the hypervisor by which the hypercall can be executed and a plurality of other memory addresses;
        in response to detecting that the token associated with the trusted program matches the saved token of the hypervisor, transmit addresses of the memory page from the hypervisor to the trusted program;
        establish a protected communication channel between the trusted program and the hypervisor such that only the trusted program is permitted to make a hypercall call for a code of the hypervisor via the protected communication channel to ensure a confidentiality of the safe hypercall address by which the code is invoked;
        perform a checksum verification for data stored in the memory page to prevent linear address attacks when a malicious program modifies the trusted program, wherein performing the checksums verification comprises periodically calculating checksums and comparing them with a previously saved value to detect a change in the trusted program and wherein the checksum verification is triggered by the trusted program making a plurality of hypercalls at equal intervals of time; and
        allow, by the hypervisor, execution of the hypercall by the trusted program accessing the safe hypercall address found at the addresses of the memory page.

6. The system of claim 5, wherein the saved token of the hypervisor is configured to be generated by the hypervisor in response to receiving a first hypercall from the trusted program.

7. The system of claim 5, wherein the processor is further configured to restore the trusted program by the hypervisor via reloading the trusted program from a disk of the computing device in response to detecting the change in the trusted program.

8. The system of claim 5, wherein the processor is further configured to:
organize, by the trusted program, virtual memory pages of an operating system of the computing device; and
verify, by the hypervisor, the virtual memory pages of the operating system.

9. A non-transitory computer readable medium storing computer executable instructions for protecting memory pages of a computing device using a bare-metal hypervisor, including instructions for:
generating by the bare-metal hypervisor a plurality of tokens, each token uniquely corresponding to a host operating system (OS) present on the computing device;
in response to receiving a hypercall from a trusted program, detecting by the bare-metal hypervisor, from the plurality of tokens, a token associated with the trusted program, wherein the trusted program is a driver of one of a plurality of OSs present on the computing device and the trusted program is loaded during initialization of the respective host OS;
checking the token associated with the trusted program against a saved token of the hypervisor;
creating, by the hypervisor, a memory page comprising a safe hypercall address of the hypervisor by which the hypercall can be executed and a plurality of other memory addresses;
in response to detecting that the token associated with the trusted program matches the saved token of the hypervisor, transmitting addresses of the memory page from the hypervisor to the trusted program;
establishing a protected communication channel between the trusted program and the hypervisor such that only the trusted program is permitted to make a hypercall call for a code of the hypervisor via the protected communication channel to ensure a confidentiality of the safe hypercall address by which the code is invoked;
performing a checksum verification for data stored in the memory page to prevent linear address attacks when a malicious program modifies the trusted program, wherein performing the checksums verification comprises periodically calculating checksums and comparing them with a previously saved value to detect a change in the trusted program and wherein the checksum verification is triggered by the trusted program making a plurality of hypercalls at equal intervals of time; and
allowing, by the hypervisor, execution of the hypercall by the trusted program accessing the safe hypercall address found at the addresses of the memory page.

10. The non-transitory computer readable medium of claim 9, wherein the saved token of the hypervisor is configured to be generated by the hypervisor in response to receiving a first hypercall from the trusted program.

11. The non-transitory computer readable medium of claim 9, wherein the instructions further comprise:
in response to detecting the change in the trusted program, restoring the trusted program by the hypervisor via reloading the trusted program from a disk of the computing device.

12. The non-transitory computer readable medium of claim 9, wherein the instructions further comprise:
configuring the trusted program to organize virtual memory pages of an operating system of the computing device; and
configuring the hypervisor to verify the virtual memory pages of the operating system.

\* \* \* \* \*